United States Patent
Liu et al.

(10) Patent No.: US 11,346,746 B2
(45) Date of Patent: May 31, 2022

(54) TESTING APPARATUS FOR DIRECTIONAL SIMULATION OF DYNAMIC COLLISION BETWEEN DEEP-SEA SHELL STRUCTURE AND SEABED

(71) Applicant: ZHEJIANG UNIVERSITY, Hangzhou (CN)

(72) Inventors: Junwei Liu, Hangzhou (CN); Shengjie Rui, Hangzhou (CN); Congbo Zhu, Hangzhou (CN); Haojie Zhang, Hangzhou (CN); Hua Yang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/766,281

(22) PCT Filed: Oct. 11, 2019

(86) PCT No.: PCT/CN2019/110634
§ 371 (c)(1),
(2) Date: Jul. 17, 2020

(87) PCT Pub. No.: WO2020/151259
PCT Pub. Date: Jul. 30, 2020

(65) Prior Publication Data
US 2021/0364382 A1    Nov. 25, 2021

(30) Foreign Application Priority Data

Jan. 22, 2019 (CN) .......................... 201910058899.5

(51) Int. Cl.
*G01M 7/08* (2006.01)
*G01M 10/00* (2006.01)

(52) U.S. Cl.
CPC .............. *G01M 7/08* (2013.01); *G01M 10/00* (2013.01)

(58) Field of Classification Search
CPC ........... G01M 7/00; G01M 7/08; G01M 10/00
See application file for complete search history.

(56) References Cited

U.S. PATENT DOCUMENTS 6,662,624 B1    12/2003   Thompson
2012/0243376 A1   9/2012   Dalmazzone et al.

FOREIGN PATENT DOCUMENTS

CN         1563984 A      1/2005
CN       101551293 A     10/2009
(Continued)

OTHER PUBLICATIONS

International Search Report (PCT/CN2019/110634); dated Jan. 16, 2020.

(Continued)

*Primary Examiner* — Jill E Culler
*Assistant Examiner* — Ruben C Parco, Jr.
(74) *Attorney, Agent, or Firm* — W&G Law Group

(57) ABSTRACT

The present disclosure discloses a testing apparatus for directional simulation of dynamic collision between a deep-sea shell structure and seabed, including: a launching device, a high-pressure water pump device, a high-speed camera, a sensor system, a data collection and control system, etc. This device is installed in a geotechnical centrifuge for experiment, a super-gravity environment is provided to meet requirements of simulation of a deep-sea environment, and a deep-sea high-pressure environment is created through a high-pressure water pump device by superposition. A direction of the launching device is adjusted through a universal rotating shaft to control the shell structure to be launched from a specified direction to collide with soil at a predeter- (Continued)

mined position. A high-speed camera is used to capture an entire experiment process, and strain and acceleration sensors are used to collect experiment data.

7 Claims, 3 Drawing Sheets

(56) References Cited

FOREIGN PATENT DOCUMENTS

| CN | 104697737 | A |   | 6/2015  |            |
|----|-----------|---|---|---------|------------|
| CN | 105588698 | A |   | 5/2016  |            |
| CN | 106092416 | A | * | 11/2016 | G01C 21/18 |
| CN | 106323590 | A |   | 1/2017  |            |
| CN | 106353066 | A |   | 1/2017  |            |
| CN | 106441777 | A |   | 2/2017  |            |
| CN | 106969897 | A |   | 7/2017  |            |
| CN | 108088640 | A | * | 5/2018  | G01M 7/08  |
| CN | 108426696 | A |   | 8/2018  |            |
| CN | 108458848 | A | * | 8/2018  | G01M 7/08  |
| CN | 108534978 | A |   | 9/2018  |            |
| CN | 208171554 | U |   | 11/2018 |            |
| CN | 208283576 | U |   | 12/2018 |            |
| CN | I09087564 | A |   | 12/2018 |            |
| CN | 109738156 | A |   | 5/2019  |            |
| GN | 205483479 | U |   | 8/2016  |            |
| JP |   0213817 | A |   | 1/1990  |            |
| JP | 2001163288| A |   | 6/2001  |            |
| JP | 2014059183| A |   | 4/2014  |            |
| KR | 20150007087| A |  | 1/2015  |            |
| KR | 20170115371| A | * | 10/2017 | G01M 10/00 |

OTHER PUBLICATIONS

CN First Office Action (201910058899.5); dated Oct. 30, 2019.
Experimental investigation on wave induced-response of seabed; Date of Mailing: Sep. 30, 2007.
Collision Dynamic Response research of a Submersible; Date of Mailing: Dec. 31, 2011.
Numerical study of impact on submarine pipeline under the Joint action of seabed and Internal Pressure; Date of Mailing:Feb. 28, 2018.

* cited by examiner

TESTING APPARATUS FOR DIRECTIONAL SIMULATION OF DYNAMIC COLLISION BETWEEN DEEP-SEA SHELL STRUCTURE AND SEABED

TECHNICAL FIELD

The present disclosure relates to a testing apparatus, and in particular, to a testing apparatus for directional simulation of dynamic collision between a deep-sea shell structure and seabed, and it simulates a deep-sea high-pressure environment by a centrifuge and a high-pressure water pump, adjusts a launching device so that the shell structure can directionally collide with soil at an estimated position, obtains a running speed, acceleration and a running trajectory of the shell structure, etc., and collects strain change of the shell structure when the shell structure collides with the soil, thereby evaluating safety of the shell structure.

BACKGROUND

The ocean accounts for about 71% of a surface area of the earth, the deep bottom is rich in oil, heavy metals and other resources, and various countries are trying to carry out technological breakthroughs in a deep-sea resource development. China also clearly proposes to build a strong marine country and to break through technical problems in development and utilization of marine resources.

Deep diving technology is a necessary means for marine development, and it is a complete system including a bathyscaph, a working mother ship (a water surface support ship) and a land base, in which the bathyscaph is a key part. At present, international underwater vehicles can generally dive to a depth of 6 kilometers, and the underwater vehicles are under tremendous compressive stress, so that when colliding with the seabed, structural buckling and instability are very likely to occur, causing disastrous consequences. Currently, strength of force-bearing of the underwater vehicle structure is generally tested in a high-pressure environment, which is usually static loading and does not involve collision with the structure, so there is an urgent need to develop a testing apparatus that can simulate dynamic collision between the underwater vehicle and the seabed under ultra-high pressure conditions.

The present disclosure proposes a testing apparatus for directional simulation of dynamic collision between the shell structure in a deep-sea and the seabed, and it simulates the deep-sea high-pressure environment by a centrifuge and a high-pressure water pump, adjusts a launching device so that the shell structure can directionally collide with soil at an estimated position, obtains a running speed, acceleration and a running trajectory of the shell structure, etc., and collects strain change of the shell structure when the shell structure collides with the soil, thereby evaluating safety of the shell structure.

SUMMARY

In view of deficiencies in the related art, the present disclosure provides a testing apparatus for directional simulation of dynamic collision of a deep-sea shell structure and seabed. This apparatus is installed in a geotechnical centrifuge for experiment, a super-gravity environment is provided to meet requirements of simulation of a deep-sea environment, and a deep-sea high-pressure environment is creased through a high-pressure water pump device by superposition, a direction of the launching device is adjusted by an universal rotating shaft to control a collision position of the capsule-type shell structure with the soil for conducting directional collision, and a high-speed camera is used to capture an entire experiment process, and strain and acceleration sensors are used to collect experiment data. The present disclosure simulates a running speed, acceleration and a running trajectory of the deep-sea shell structure when it collides with a surface of the soil at the seabed at a specific position after being launched from different specified directions, and obtains strain change of the shell structure during the collision and stiffness change of the soil after the collision.

The present disclosure adopts a following technical solution.

The present disclosure provides a testing apparatus for directional simulation of dynamic collision between a deep-sea shell structure and seabed, including a closed steel tank sink, a launching device, a high-pressure water pump device, a high-speed camera, a sensor system, and a data collection and control system. The steel tank sink is arranged in a geotechnical centrifuge, the high-pressure water pump device is led into the steel tank sink through a water injecting pipe, a pressure gauge and a flowmeter are installed on the water injecting pipe, and soil is laid in the steel tank sink. The launching device includes: a guide rod, a fixing groove for the launching device, a catapult, a glass-fiber rope, an electric spool and a titanium alloy capsule-type shell structure. The guide rod has an end connected to a bottom surface of the steel tank sink through a universal rotating shaft and another end connected to the fixing groove for the launching device. The electric spool is fixed to the guide rod, the shell structure is arranged around the guide rod and connected to the electric spool through the glass-fiber rope, the catapult is fixed in the fixing groove for the launching device, the launching device can eject the shell structure through the catapult. The steel tank sink is provided with an observation window, the high-speed camera is configured to capture, through the observation window, and record a movement trajectory of the shell structure during an experiment, the sensor system is configured to detect data to be detected in the apparatus and wirelessly transmit the date to the data collection and control system, and the data collection and control system is configured to process and analyze the data.

In the above technical solution, the steel tank sink has an opening where a fixing flange disk for the sink is provided, and a top cover for the sink and the fixing flange disk for the sink are tightly pressed by a high-strength bolt. In the entire experiment, the water tank is for simulating the deep-sea high-pressure environment, so tightness requirements of the water tank are extremely high. Steel is used to form the steel tank skeleton of the water tank. Moreover, in order to facilitate observation for running of the shell structure in the experiment, front, upper and right sides of the sink are each provided with an observation window, and the observation window uses a high-strength glass plate. In addition, the top cover for the sink and the fixing flange disk for the sink are tightly pressed by the high-strength bolt, thereby ensuring that a mechanism can withstand a high pressure generated during the experiment, and it is necessary to seal with foam glue to avoid experimental errors which affect accuracy of a testing process.

Preferably, in order to enable the titanium alloy shell structure to collide, at a specific capsule position, with the soil at the bottom of the steel tank in a specified direction, a fixing steel block for the rotating shaft is arranged in the soil at the bottom of the water steel tank sink and used to install the universal rotating shaft, and through the universal rotating shaft, the rotating shaft can rotate by 360 degrees to a determined direction and is then fixed thereto, so as to ensure that the shell structure collides with the soil at the bottom at an estimated position in the testing process.

Preferably, in order to distinguish collision situations of the shell structure in different environments in more detail, the soil at the bottom of the steel tank may be selected from sand, rock, clay, etc., and inclination of the soil can be set, such as a flat soil surface or an inclined soil surface for the testing process.

Preferably, the sensor system includes a triaxial acceleration sensor, a strain rosette, an inclinometer provided on the shell structure, and an acceleration sensor and a bending element in the soil. The triaxial acceleration sensor is arranged at a front end of the shell structure and used to continuously collect, in real time, movement acceleration in three directions of the shell structure during the testing process. Signals are transmitted by a data wire to the data collection and control system through a data transmission port, and velocity and displacement signals can be obtained according to the acceleration signals by integration. When the shell structure collides with the bottom soil, structural strain and local strain will change, so four strain rosettes are arranged axis-symmetrically along an axial direction of the shell structure, and each of the four strain rosettes is formed by three strain gauges sequentially arranged in a fan shape at a 45-degree angle. The inclinometer can measure change of inclination of the shell structure during the testing process, and the collision position can be roughly determined. The bending element is arranged in the soil inside the water tank and used to obtain change of stiffness of the soil when the shell structure collides. The acceleration sensor in the soil is used to obtain an acceleration generated by the soil when the shell structure collides with the soil. A data transmission wire of the sensor is connected to a data collection and processing device through the data transmission port on a top plate of an upper part of the sink.

Preferably, a high-speed camera is arranged in front of the observation window at a front side of the steel tank and used to capture the running trajectory of the shell structure during the experiment, and a capturing frequency of the high-speed camera generally has a recording speed as high as 1000 frames per second to 10000 frames per second, so that the entire experimental process can be clearly illustrated.

The present device is installed in a geotechnical centrifuge for experiment, a super-gravity environment is provided to meet the requirements of simulation of a deep-sea environment. A high-pressure water pump device creates a deep-sea environment of about 40 MPa in a steel tank sink through a water injecting pipe. A pressure gauge and a flowmeter are used to monitor the high-pressure water pump device. Meanwhile, in order to be able to clearly capture the running of the shell structure during the experiment, front, upper and right sides of the sink are each provided with an observation window, which uses a high-strength glass plate. The launching device controlling the shell structure can ensure that the shell structure can collide, at a specific position, with the soil at bottom of the steel tank in a specified direction. In order to facilitate repeating the testing process and avoiding opening the opening of the steel tank for multiple operations, a lightweight high-strength glass-fiber rope is used to connect a tail of the shell structure with the launching device, and after controlling an electric spool by a switch at ending of one launch, the lightweight high-strength glass-fiber rope can be tightened, and the fixing groove for the launching device is used to capture the shell structure to re-prepare for a next testing process.

The present disclosure has following characteristics.

1. The present disclosure can accurately simulate/restore a deep-sea high-pressure environment through the high-pressure water pump, simulate the situation of directional dynamic collision between the deep-sea shell structure and the seabed, and pay attention to maintaining tightness.

2. A position on the shell structure where collision occurs can be adjusted, and thus structural safety of the shell structure can be studied by making a theoretically weakest position on the shell structure collide with the seabed.

3. The present disclosure can conduct multiple testing processes by using the lightweight high-strength glass-fiber rope to pull the shell structure to reset, use the universal rotating shaft to adjust an angle direction of the shell structure when being launched, and can change a type of the soil at the bottom of the steel tank, such as rock, sand, and clay, thereby studying situations of the collision of the shell structure under different seabed conditions.

4. In the present disclosure, the acceleration sensor and the strain gauge are used to collect movement data of the shell structure during the experiment for analyzing, and the high-speed camera is used to record the entire testing process.

In the figures, 1. bending element; 2. steel tank sink; 3. observation window; 4. control wire; 5. data transmission port; 6. top cover for the sink; 7. high-strength bolt; 8. high-pressure water pump device; 9. pressure gauge; 10. flowmeter; 11. water injecting pipe; 12. fixing flange for the sink; 13. acceleration sensor; 14. soil; 15. fixing steel block for a rotating shaft; 16. universal rotating shaft; 17. guide rod; 18. fixing groove for the launching device; 19. catapult; 20. strain rosette; 21. shell structure; 22. inclinometer; 23. glass-fiber rope; 24. electric spool; 25. triaxial acceleration sensor; and 26. high-speed camera.

DESCRIPTION OF EMBODIMENTS

An embodiment of the present disclosure provides a testing apparatus for directional simulation of dynamic collision between a deep-sea shell structure and seabed, and the testing apparatus is installed in a geotechnical centrifuge for experiment, a super-gravity environment is provided to meet requirements of simulation of a deep-sea environment, and a deep-sea high-pressure environment is created through a high-pressure water pump device by superposition, a direction of the launching device is adjusted by a universal rotating shaft to control a collision position of a titanium alloy capsule-type shell structure with the soil for directional collision, a high-speed camera is used to capture an entire experiment process, and strain and acceleration sensors are used collect experiment data. The present disclosure simulates a running speed, acceleration and a running trajectory of the deep-sea shell structure (such as a bathyscaph) when it collides with a surface of the soli at the seabed at a specific position after being launched from different specified directions, and obtains strain change of the shell structure during the collision and stiffness change of the soil after the collision.

Figure 1:
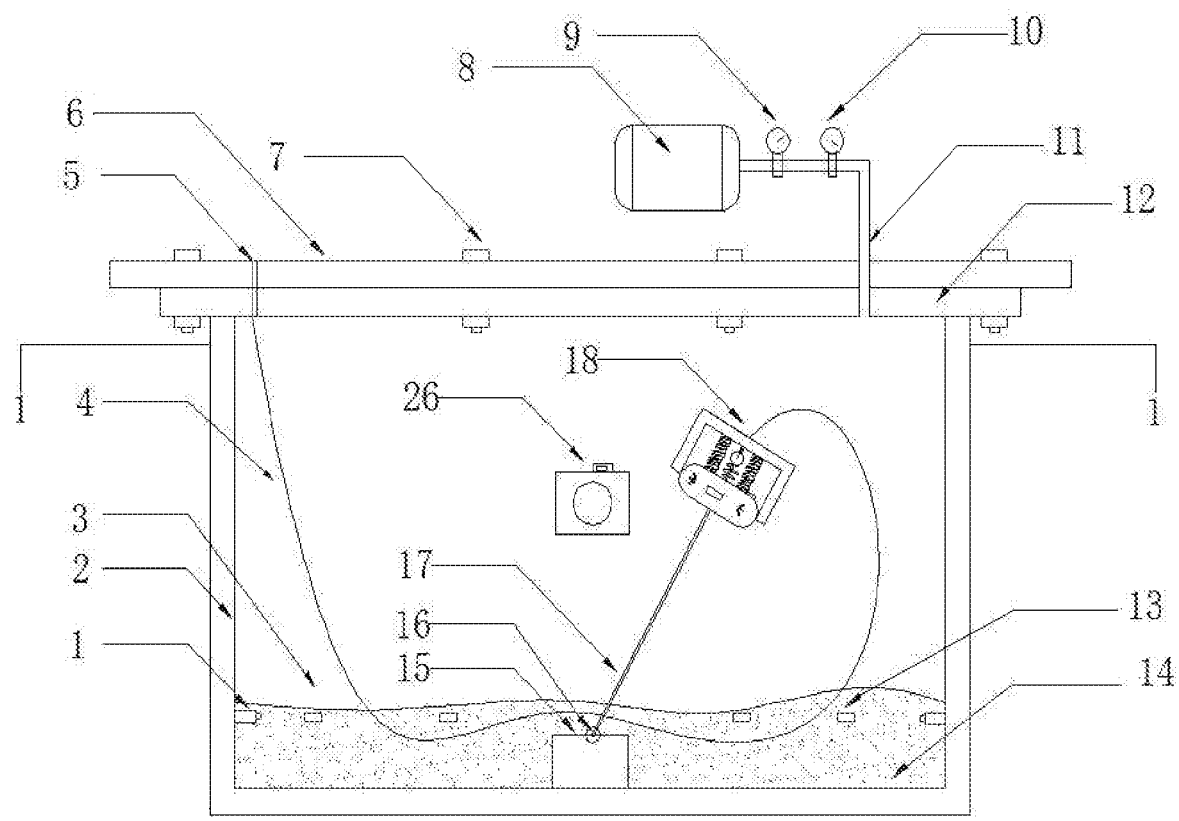
FIG. 1 is a front view of a specific testing apparatus of the present disclosure.
Figure 2:
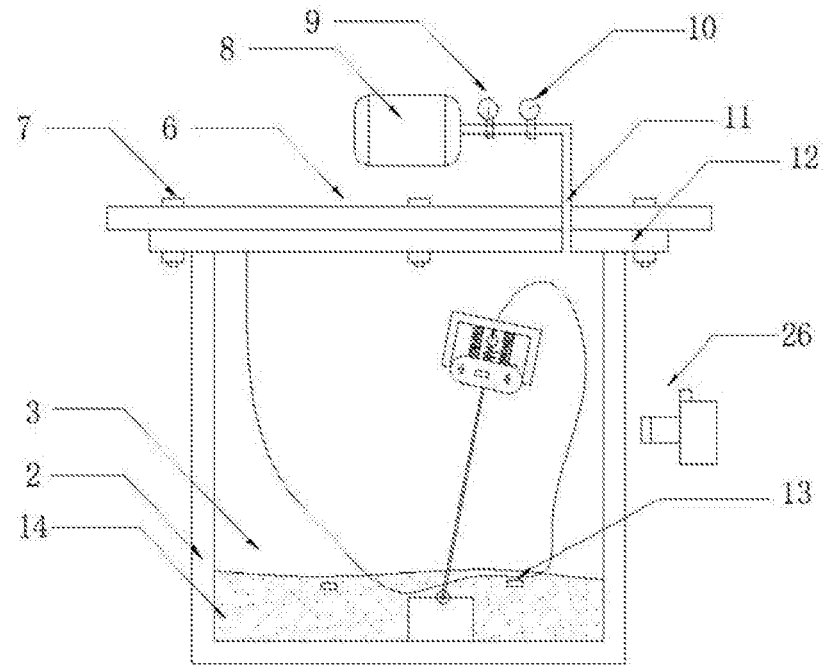
FIG. 2 is a right side view of FIG. 1.
Figure 3:
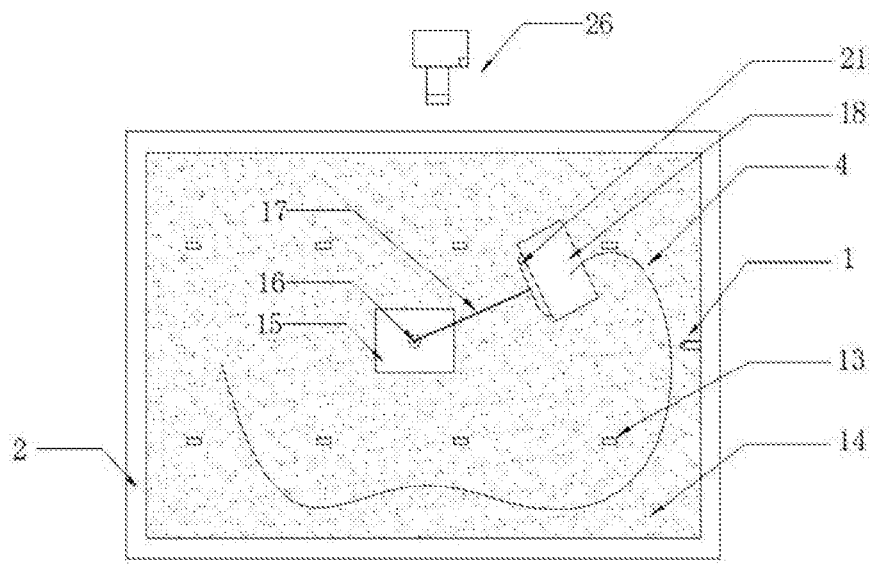
FIG. 3 is a top view of a cross-section 1-1 in FIG. 1.
Figure 4:
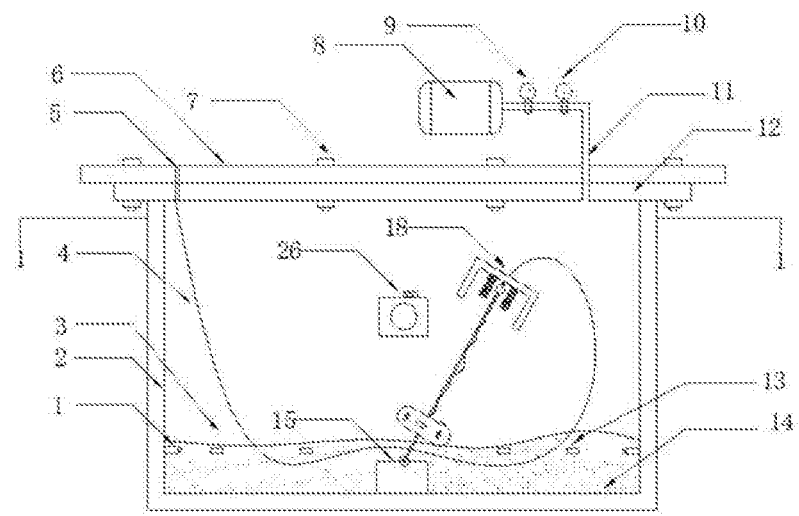
FIG. 4 is a diagram illustrating collision of a shell structure after being launched.
Figure 5:
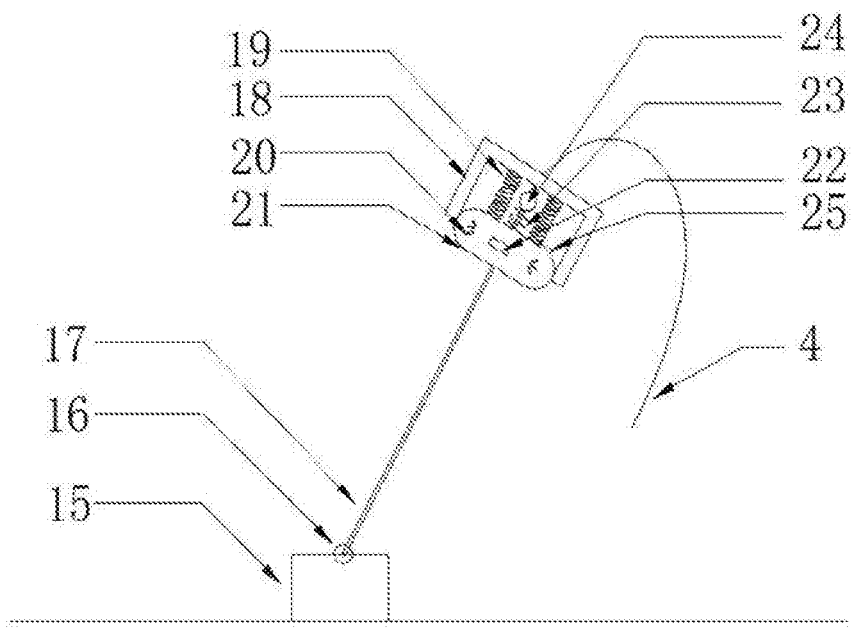
FIG. 5 is a schematic diagram of details of a launching device.

Specifically, as shown in FIG. 1 to FIG. 5, a specific embodiment is as follows.

The apparatus is installed in a geotechnical centrifuge for experiment, and a super-gravity environment is provided to meet the requirements of simulation of the deep-sea environment. The high-pressure water pump device 8 creates a deep-sea environment of about 40 MPa in a steel tank sink 2 through a water injecting pipe 11. A pressure gauge 9 and a flowmeter 10 are used to monitor the high-pressure water pump device 8. Meanwhile, in order to be able to clearly capture the running of the shell structure during the experiment, front, upper and right sides of the sink are each provided with an observation window 3, which uses a high-strength glass plate. The launching device controlling the shell structure includes a guide rod 17, a fixing groove 18 for the launching device, a catapult 19, a lightweight high-strength glass-fiber rope 23, an electric spool 24 and a titanium alloy capsule-type shell structure 21, and it can ensure that the titanium alloy shell structure 21 can collide, at a specific position, with the soil 14 at bottom of the steel tank in a specified direction. The high-speed camera 26 continuously captures and records, at a very high frequency, the running trajectory of the shell structure during the entire experiment. The sensor system is used to detect data to be detected in the apparatus and wirelessly transmit it to a data collection and control system, and the data collection and control system is used to process and analyze the data.

In the entire experiment, the water tank is for simulating the deep-sea high-pressure environment, so tightness requirements of the water tank are extremely high. Steel is used to form the steel tank sink 2 of the water tank. Front, upper and right sides of the sink are each provided with an observation window 3, and the observation windows 3 uses a high-strength glass plate. Moreover, the steel tank sink 2 is provided with the top cover 6 for the sink and the fixing flange disk 12 for the sink that are tightly pressed by a high-strength bolt 7, thereby ensuring that a mechanism can withstand a high pressure generated during the experiment, and it is necessary to seal with foam glue to avoid experimental errors which affect accuracy of the testing process.

In order to enable the titanium alloy shell structure 21 to collide, at a specific position, with the soil 14 at the bottom of the steel tank in a specified direction, a fixing steel block 15 for a rotating shaft is arranged in the soil at the bottom of the sink and used to install the universal rotating shaft 16, and through the universal rotating shaft, the rotating shaft can rotate by 360 degrees to a determined direction and is then fixed thereto, so as to ensure that the shell structure collides with the soil at the bottom at an estimated position in the testing process.

In order to distinguish collision situations of the shell structure 21 in different environments in more detail, the soil 14 at the bottom of the steel tank may be selected from sand, rock, clay, etc., and inclination of the soil can be set, such as a flat soil surface or an inclined soil surface for the testing process.

The sensor system includes a triaxial acceleration sensor 25, a strain rosette 20, an inclinometer 22 provided on the shell structure, and an acceleration sensor 13 and a bending element 1 in the soil. The triaxial acceleration sensor 25 is arranged at a front end of the shell structure 21 and used to continuously collect, in real time, movement acceleration in three directions of the shell structure during the testing process. Signals are transmitted by a data wire to the data collection and control system through a data transmission port, and velocity and displacement signals can be obtained according to the acceleration signals by integration. When the shell structure 21 collides with the bottom soil, structural strain and local strain will change, so four strain rosettes are arranged axis-symmetrically along an axial direction of the shell structure, and each of the four strain rosettes is formed by three strain gauges sequentially arranged in a fan shape at a 45-degree angle. The inclinometer 22 can measure change of inclination of the shell structure during the testing process, and the collision position can be roughly determined. The bending element 1 is arranged in the soil inside the water tank and used to obtain change of stiffness of the soil when the shell structure collides. The acceleration sensor 13 in the soil is used to obtain an acceleration generated by the soil when the shell structure collides with the soil. A data transmission wire of the sensor is connected to a data collection and processing device through the data transmission port 5 on a top plate of an upper part of the sink.

A high-speed camera 26 is arranged in front of the observation window at a front side of the steel tank and used to capture the running trajectory of the shell structure during the experiment, and a capturing frequency of the high-speed camera generally has a recording speed as high as 1000 frames per second to 10000 frames per second, so that the entire experimental process can be clearly illustrated.

Taking a case where the collision testing process is performed in the sand as an example, a specific testing process using the apparatus of the above embodiment of the present disclosure is briefly described as follows.

1. Testing sand is laid on the bottom of the steel tank, and flatness or sand content of the soil surface are changed according to the testing requirements.

2. Testing components are installed. The launching device and the universal rotating shaft are installed to the fixing steel block at the bottom of the steel tank and well debugged. An angle of the guide rod is adjusted according to a required collision angle of the shell structure and is firmly fixed.

3. The sensor is arranged. The triaxial acceleration sensor is installed to the front top of the titanium alloy shell structure, and the strain rosettes are symmetrically bonded to an outer side of the shell structure using waterproof glue, and it is confirmed that a performance of the sensor is usable. The acceleration sensor, the bending element and the like are buried into the soil, and the data transmission wire is led out of the water tank through the data transmission port.

4. The high-strength bolt is used to connect the top plate for the sink with the fixing flange for the sink, thereby ensuring that the entire testing equipment is closed, airtight and impermeable.

5. The high-pressure water pump is turned on to inject water to perform pressurizing, meanwhile the centrifuge is used, so as to conduct the testing process, after meeting testing requirements, multiple testing processes are conducted by controlling the electric spool to recover the shell structure. The experimental data is collected by the data collection device.

6. When the testing processes are completed, decompression and drainage are performed, and the opening of the steel tank is opened to recover the testing apparatus.

What is claimed is:

1. A testing apparatus for directional simulation of dynamic collision between a deep-sea shell structure and seabed, comprising:

a closed steel tank sink, a launching device, a high-pressure water pump device, a high-speed camera, a sensor system, and a data collection and control system;

wherein the steel tank sink is arranged in a geotechnical centrifuge, the high-pressure water pump device pumps water into the steel tank sink through a water injecting pipe, a pressure gauge and a flowmeter are installed on the water injecting pipe, and soil is laid in the steel tank sink;

the launching device comprises:

a guide rod, a fixing housing for the launching device, a catapult, a glass-fiber rope, an electric spool and a titanium alloy capsule-type shell structure;

the guide rod has an end connected to a bottom surface of the steel tank sink through a universal rotating connector, and another end connected to the fixing housing for the launching device;

the electric spool is fixed to the guide rod, the shell structure is arranged around the guide rod and connected to the electric spool through the glass-fiber rope, the steel tank sink is provided with an observation window, the high-speed camera is configured to capture, through the observation window, and record a movement trajectory of the shell structure during an experiment, the sensor system is configured to detect data to be detected in the testing apparatus and wirelessly transmit the data to the data collection and control system, and the data collection and control system is configured to process and analyze the data.

2. The testing apparatus for directional simulation of dynamic collision between the deep-sea shell structure and seabed according to claim 1, wherein the steel tank sink has an opening where a fixing flange disk for the sink is provided, and a top cover for the sink and the fixing flange disk for the sink are tightly pressed by a high-strength bolt.

3. The testing apparatus for directional simulation of dynamic collision between the deep-sea shell structure and seabed according to claim 1, wherein the soil at a bottom of the steel tank sink is selected from sand, rock or clay, and an inclination of the soil is settable for a testing process.

4. The testing apparatus for directional simulation of dynamic collision between the deep-sea shell structure and seabed according to claim 1, wherein the sensor system comprises a triaxial acceleration sensor, a strain rosette, and an inclinometer that are arranged on the shell structure, and an acceleration sensor and a bending element that are arranged in the soil.

5. The testing apparatus for directional simulation of dynamic collision between the deep-sea shell structure and seabed according to claim 4, wherein the triaxial acceleration sensor is arranged at a front top portion of the shell structure and is configured to continuously collect motion acceleration measurements of the shell structure in real time during a testing process.

6. The testing apparatus for directional simulation of dynamic collision between the deep-sea shell structure and seabed according to claim 4, wherein four strain rosettes are axis-symmetrically arranged on an axial direction of the shell structure, and each of the four strain rosettes comprises three strain gauges sequentially arranged in a fan shape at a 45-degree angle.

7. The testing apparatus for directional simulation of dynamic collision between the deep-sea shell structure and seabed according to claim 1, wherein a capturing frequency of the high-speed camera ranges from 1000 frames per second to 10000 frames per second.

* * * * *